United States Patent Office 3,621,702
Patented Nov. 23, 1971

3,621,702
CONTINUOUS SWAGING APPARATUS
Bruno Kralowetz, Weinleiten 142,
St. Ulrich, Steyr, Austria
Filed Feb. 10, 1970, Ser. No. 10,237
Claims priority, application Austria, Feb. 25, 1969,
A 1,866/69
Int. Cl. B21j 7/14
U.S. Cl. 72—429                                    3 Claims

ABSTRACT OF THE DISCLOSURE

A continuous swaging apparatus provided with at least two hammers, each generally located radial with respect to the workpiece, and actuated in a reciprocating, oscillating motion to swage, and also feed the continuous workpiece. The feed movement of the workpiece can be of a specific requirement independently of the hammer blow requirements. This is accomplished by actuating the reciprocating motion of the hammers and the oscillation motion of the hammers by two different eccentrics.

---

Figure 1:
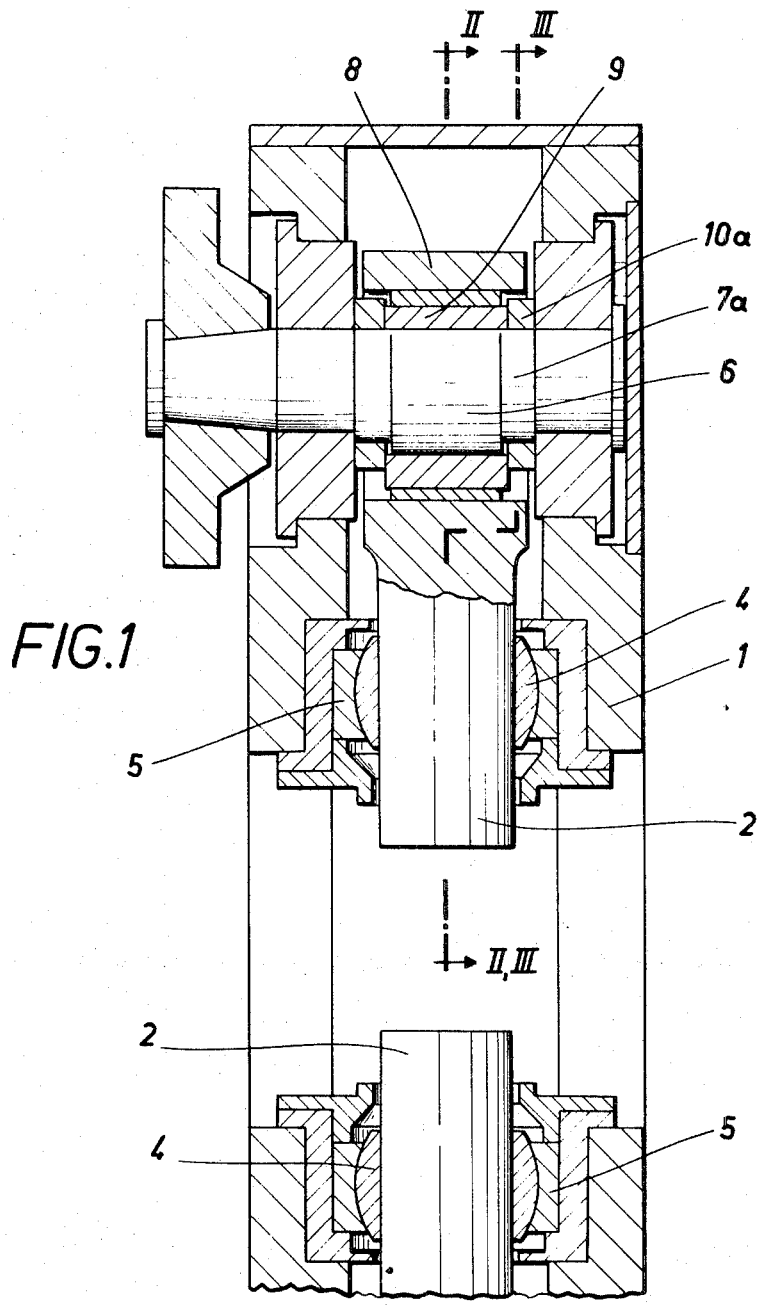

This invention relates to an apparatus for a continuous swaging of rod-shaped or continuous workpieces, which apparatus comprises at least two hammers, which extend radially with respect to the axis of the workpiece and are driven by respective eccentric shafts and slidable in a rotatable guide, the axes of the eccentric shafts extending transversely to the axis of the workpiece.

In such apparatus the hammers are similar to connecting rods and owing to the special arrangement of the eccentric shafts perform not only an axial movement toward the workpiece but also a pivotal or oscillating motion about the axes of rotation of the guides so that the hammers do not only shape the workpiece so as to reduce its cross-section but also feed it in the direction of the axis of the workpiece. If such apparatus precedes a similar or different apparatus, it will obviously be necessary to match the speed of the workpiece to the operation of the succeeding apparatus. This might be accomplished by a variation of the speed of the eccentric shafts or of the eccentricity of the eccentrics or of the lever ratio of the hammers, which are similar to connecting rods. That lever ratio depends on the length of the hammer from the eccentric to the rotatable guide and the length of the hammer from the guide to the hammer end carrying the die. This variation, however, involves special difficulties if the speed of the workpiece is very low, as is often required in practice. If it were attempted to match the speed by a change of the lever ratio, the overall dimensions would have to be changed to such an extent that this measure cannot be adopted.

On the other hand, a desirable maximum reduction in cross-section cannot be accomplished unless the eccentricity of the eccentrics is selected in view of the cross-section of the workpiece so that a change in eccentricity cannot be used to control the feeding speed of the workpiece. Hence, the only remaining possibility resides in a reduction of the speed of the eccentric shafts and consequently the number of hammer blows per unit of time (hammer blow frequency). Whereas this will reduce the speed of the workpiece, the feed per hammer blow will remain constant. In a continuous swaging apparatus of the kind described first hereinbefore it would be desirable to select the eccentricity of the eccentrics in view of the cross-section of the workpiece, to select the speed of the eccentric shafts and the hammer blow frequency in view of the size and capacity of the apparatus, and separately to select the feed in view of the requirements to be met and the conditions which result from the cooperation of two or more apparatus arranged one behind the other.

Another disadvantage of the known apparatus resides in that each hammer imparts to the workpiece the maximum feeding speed when the hammer is at its inner dead center and the die has penetrated the workpiece to the largest depth. The hammer or die initially engages the workpiece and moves it at a low speed, which is increased as the workpiece is shaped, and the highest speed is obtained at the time at which the hammer or die begins to disengage the workpiece. This speed function will be particularly undesirable if a plurality of identical apparatus are arranged one behind the other and pairs of hammers of different apparatus must blow at the same time. It must be borne in mind that the hammer blow results in an elongation of the workpiece not only in the feeding direction but partly also opposite to the feeding direction so that a matching of apparatus blowing at the same time is even more difficult.

Whereas a swaging machine is known in which each hammer comprises a spider of an elliptic chuck having a link which encloses the eccentric of the respective eccentric shaft and is slidable transversely to the hammer axis. In that machine, the eccentric shafts are parallel to the workpiece axis and the hammers are mounted in stationary radial guides carried by the forging box so that the hammers perform only axial movements in a radial direction with respect to the workpiece and do not perform any oscillating movements so that an additional feeding mechanism is required and the hammers cannot follow the stretching movements imposed upon the workpiece in the case of a large reduction in cross-section.

Hence, it is an object of the invention to eliminate all these disadvantages and to provide an apparatus for a continuous swaging of rod-shaped or continuous workpieces which is relatively simple in design and enables a selection of the feed movement of the workpiece in view of specific requirements independently of the hammer blow frequency, the eccentricity, which controls the reduction in cross-section of the workpiece, and the lever ratio of the hammers.

In an apparatus of the kind described first hereinbefore, the invention accomplishes the above object in that each eccentric shaft comprises for each hammer two eccentrics, which are disposed one beside the other and differ in eccentricity and/or angular position, and the hammers form in known manner quadrangular frames which surround the eccentric like the spiders of elliptic chucks, and in which links are mounted, which are associated with the eccentric, that link which encloses one eccentric being slidable within the frame only in the longitudinal direction of the hammer, and the link which encloses the other eccentric being slidable only in the transverse direction. Hence, that eccentric which is associated with the link that is slidable in the spiderlike hammer frame only transversely to the longitudinal direction of the hammer imparts to the hammer only the axial movement to and from the workpiece to shape the same, whereas the other eccentric having associated with it a link which is slidable in the hammer in the longitudinal direction thereof imparts to the hammer a pivotal movement about the axis of rotation of the guide and thus imparts a workpiece-feeding movement of the hammer. Hence, different eccentrics are used to transmit power and impart motion to the hammers for shaping the workpiece and for feeding the workpiece, respectively, so that the speed of the workpiece can be selected to meet different requirements, independently of the factors which control the shaping operation, by a selection of such eccentricities for the two eccentrics and/or by a selection of a desired angle between the eccentrics. For instance, if the eccentricity of the eccentric which is used for the shaping work or the swaging stroke is large relative to the eccentric which effects the feeding of the workpiece, a low feeding speed in conjunction with a large reduction of the cross-section of the workpiece can be obtained whereas the blow frequency is not changed. Only the feed per hammer blow is reduced. Alternatively, one eccentric may lead the other or lag behind the same so that the speed function during a hammer blow is changed and the workpiece speed can be considerably changed in adaptation to the resultant speed which is due to the working of the workpiece in two or more apparatus arranged one behind the other and by the flow of material due to the elongation of the workpiece. The invention results in a comparatively simple design because it is sufficient to provide each eccentric shaft with two different eccentrics and to provide corresponding links in the hammers, which form frames that are similar to the spiders of elliptic chucks.

To provide favorable loading conditions and distributions of forces, two equal eccentrics are symmetrically disposed with respect to a wider intermediate eccentric, which differs in eccentricity and/or angular position, and three links are provided, and the intermediate one of said links is preferably slidable transversely to the longitudinal direction of the hammer to transmit the forces for the shaping work. Hence, one of the two eccentrics which are basically required is divided into two perfectly identical eccentrics.

An embodiment of the invention is shown by way of example on the accompanying drawings, in which FIG. 1 is a sectional view taken at right angles to the axis of the workpiece and showing the essential parts of an apparatus for a continuous swaging of rod-shaped or continuous workpieces.

Figure 2:
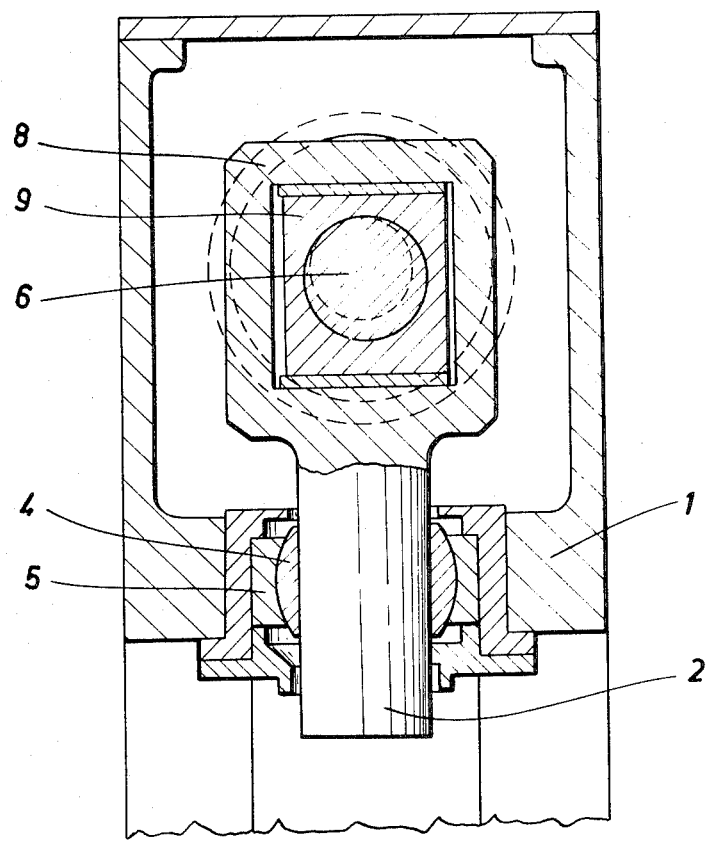
Figure 3:
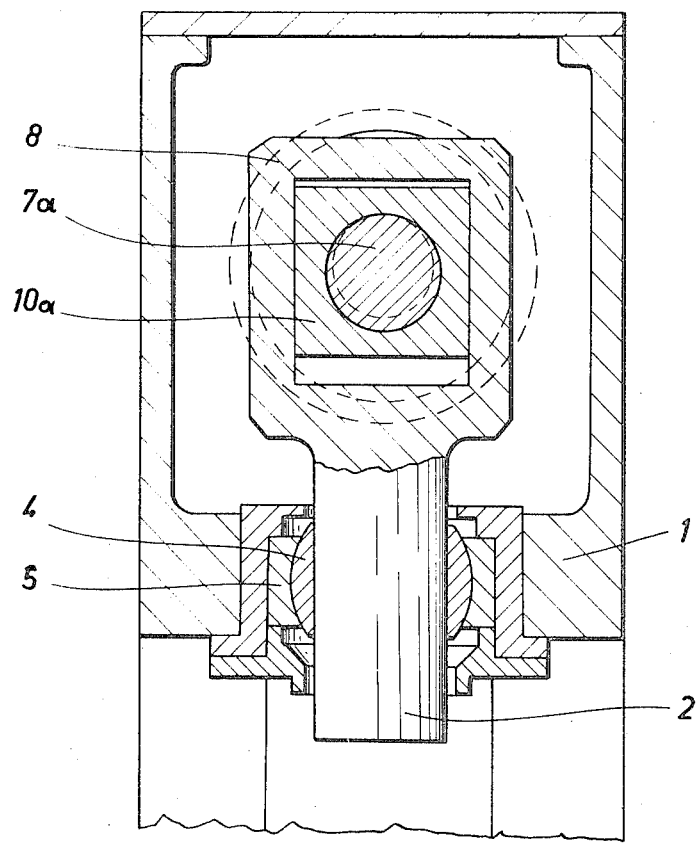
Figure 4:
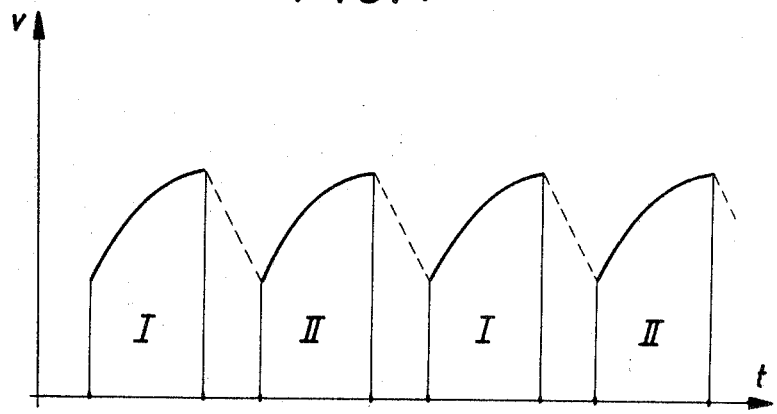
Figure 5:
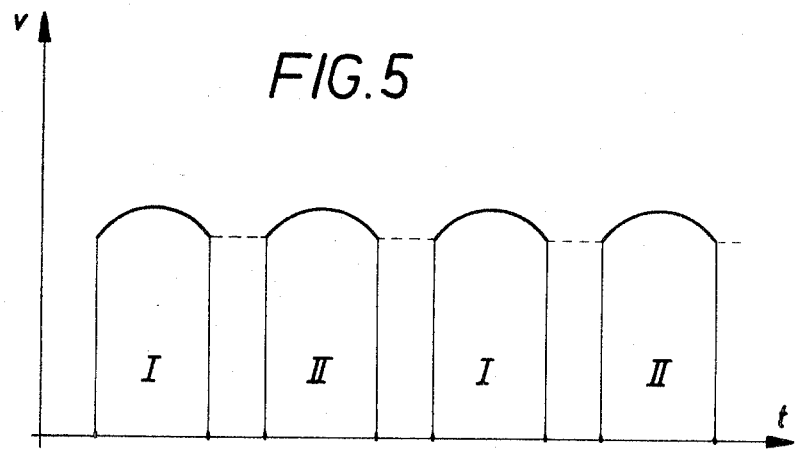

FIGS. 2 and 3 are sectional views taken on lines II—II and III—III in FIG. 1 and FIGS. 4 and 5 are diagrams representing the change of the feeding speeds imparted to the workpiece by the hammers.

Two hammers 2, which extend radially toward the workpiece and are mutually diametrically arranged are provided in an apparatus housing 1. The hammers 2 are driven by eccentric shafts 3, which extend transversely to the axis of the workpiece. The hammers 2 are slidable in guides 4, which have a spherical outside surface fitting corresponding shell members 5 so that the guides 4 are universally rotatable. Whereas it would be sufficient to provide guides which are rotatable about an axis which is parallel to the eccentric shafts, a universal rotatability will be preferable to enable a compensation of manufacturing inaccuracies.

Each eccentric shaft 3 has for each hammer 2 two eccentrics 6, 7, 7a, which are disposed one beside the other. The two eccentrics 7, 7a, may be considered parts of a single eccentric. As is particularly apparent from FIGS. 2 and 3, the eccentric 6, on the one hand, and the two eccentrics 7, 7a, on the other hand, differ not only in eccentricity but are also angularly offset from each other by about 30°. The hammers 2 form frames 8, which are similar to the spiders of elliptic chucks and surround the eccentrics. Each frame 8 has three links 9, 10, 10a mounted therein, which are associated with respective eccentrics 6, 7, 7a. The link 9 (FIG. 2) is slidable within the frame 8 only transversely to the longitudinal direction of the hammer. The action of the eccentric 6 and link 9 alone would result only in a straight-line movement of the hammer to and from the workpiece. Hence the eccentric 6 and the link 9 are used only for the shaping work proper. The links 10, 10a, which enclose the eccentrics 7, 7a, are slidable in the frame 8 only in the longitudinal direction of the hammer (FIG. 3) so that they impart to the hammer oscillating pivotal movements in a plane which is normal to the eccentric shaft and passes through the workpiece axis. Because the reciprocating motion of the hammers and the oscillating motion of the hammers are imparted to the hammers by two different eccentrics, the feeding of the workpiece, which is due only to the oscillating motion, may be controlled independently of the conditions which control the shaping work.

In the diagrams shown in FIGS. 4 and 5, the speed $v$ of the movement of the die-carrying end of the hammer in the workpiece-feeding direction is plotted on the axis of ordinates and the time $t$ is ploted on the axis of abscissae. Each curve represents one hammer blow. It is assumed that two identical apparatus I, II are arranged one behind the other and blow in alternation so that the first curve relates to the hammer blow in the first apparatus, the second curve relates to the hammer blow of the second apparatus, etc. It is assumed in FIG. 4 that the two eccentrics have the same angular position or there is only one eccentric for the entire motion of the manners. The workpiece is engaged by the hammers and fed at a low speed at the beginning of the blow and is highly accelerated during the shaping operation so that the feeding speed is highly irregular and the workpiece must be retarded or braked until the next hammer blow is delivered. This retardation is indicated by the dotted lines which connect the curves. FIG. 5 represents the conditions obtained with the eccentric assembly shown in FIGS. 2 and 3. The eccentric 7, 7a leads the eccentric 6 by about 30° so that the workpiece can be fed at a much more uniform speed and a retardation or acceleration of the workpiece between the hammer blows can be avoided. The angle of lead or lag of the two eccentrics may be selected to vary that curve so as to obtain a feeding speed which meets to a large extent the requirements to be fulfilled.

What is claimed is:
1. Apparatus for a continuous swaging of elongated workpieces, which comprises:
   means defining a path of longitudinal travel for an elongated workpiece,
   at least two hammers, each of which has a longitudinal direction which is generally radial with respect to said path,
   a plurality of rotatable guides, each of said hammers being mounted in one of said guides and slidable therein in said longitudinal direction,
   a plurality of eccentric shafts, each of which is associated with one of said hammers and has an axis which is transverse to said path,
   a plurality of sets of eccentric means, each of said sets being carried by one of said eccentric shafts and comprising first and second eccentric means, which differ from each other in at least one of the properties consisting of the eccentricity and the direction of a line connecting the geometric center of the eccentric means to the axis of the respective eccentric shafts, and
   a plurality of quadrangular frames, each of which is associated with one of said hammers, which is rigid with the respective hammer and surrounds the set of eccentric means on the associated eccentric shaft, first link means enclosing said first eccentric means and mounted in said frame for a sliding movement only in the longitudinal direction of the associated hammer, and second link means enclosing second eccentric means and mounted in said frame for a sliding movement only in a direction which is transverse to the longitudinal direction of said hammer.

2. Apparatus as set forth in claim 1, in which:
one of said eccentric means of each set comprises two eccentrics which are identical with respect to said properties and the other of said eccentric means of each set comprises an eccentric which is wider than each of said two eccentrics and disposed between them, and one of said link means of each of said elliptical chucks comprises two link members, each of which encloses one of said two eccentrics.

3. Apparatus as set forth in claim 1, in which said first eccentric means of each of said sets comprises said two eccentrics.

References Cited

UNITED STATES PATENTS

| 1,984,603 | 12/1934 | Singer | 72—452 |
| 2,903,923 | 9/1959 | Kralowetz | 72—189 |
| 3,028,775 | 4/1962 | Kralowetz | 72—399 |
| 3,165,012 | 1/1965 | Kralowetz | 72—402 |
| 3,224,244 | 12/1965 | Kralowetz | 72—402 |

CHARLES W. LANHAM, Primary Examiner

G. P. CROSBY, Assistant Examiner

U.S. Cl. X.R.

72—450, 452